Feb. 5, 1929.  
L. W. CHRISTOPHEL  
1,700,998  
LOCK FOR TRUNKS  
Filed June 17, 1926
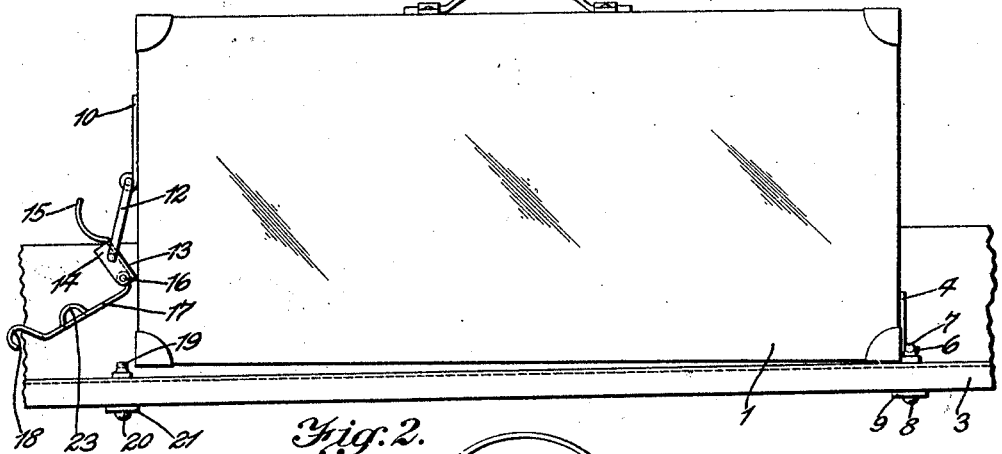
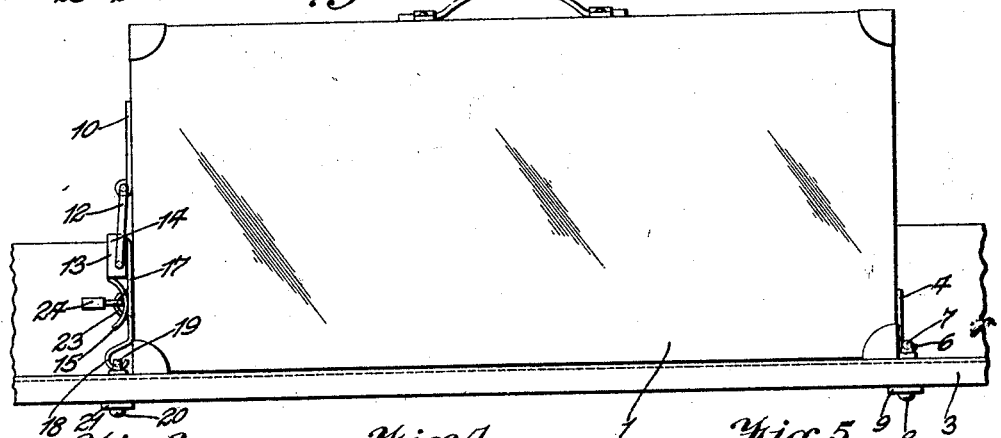
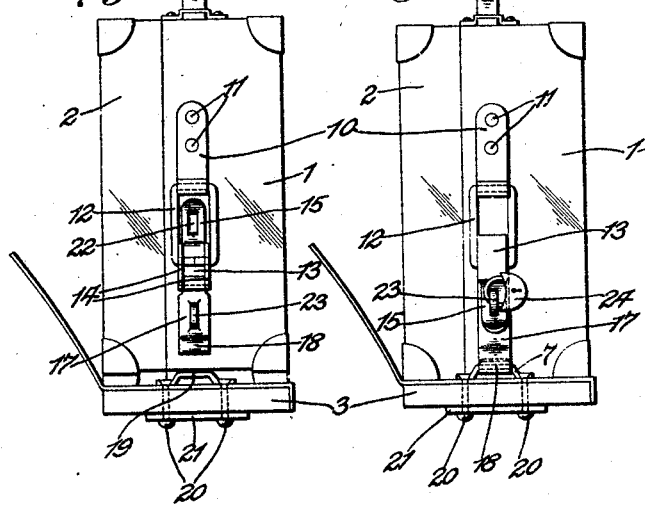
Inventor:  
Lewis W. Christophel,  
by Rippey & Kingsland  
His Attorneys.

Patented Feb. 5, 1929.

1,700,998

UNITED STATES PATENT OFFICE.

LEWIS W. CHRISTOPHEL, OF CLAYTON, MISSOURI, ASSIGNOR TO ATLAS TACK CORPORATION, OF FAIRHAVEN, MASSACHUSETTS, A CORPORATION OF NEW YORK.

LOCK FOR TRUNKS.

Application filed June 17, 1926. Serial No. 116,516.

This invention relates to locks for trunks and the like whereby the trunk or the like may be securely attached to a support as, for instance, the runningboard or other part of an automobile.

An object of the invention is to provide an improved device designed and adapted to be attached to a trunk or similar article for securing the same in rigid connection with a support.

Another object of the invention is to provide a device of the character mentioned constructed for cooperation with a lock whereby the trunk or the like may be securely locked to a support, thus avoiding all danger of loss of the trunk and preventing tampering therewith by unauthorized persons.

It is a familiar fact that persons traveling by automobile are often required to mount trunks and other luggage upon the running board or other exposed part of the automobile, and the existing problem has been to obtain satisfactory means for attachment to prevent loss of or tampering with the trunk, to prevent rattling or chattering of the trunk upon the support as a result of the vibration of the automobile when traveling, to support the trunk in such a way that it cannot be opened by an unauthorized person while it is attached to the fixed part of the automobile, and to enable the owner easily and expeditiously to remove the trunk from the support to which it is attached.

Another object of the invention is to provide means whereby these needs and requirements are met and which may be economically manufactured and easily assembled in proper relationship to the trunk and to the support, and to obtain all of the other advantages herein disclosed, reference being made to the drawing in which Fig. 1 is a side elevation of a trunk mounted on the runningboard of an automobile and having the present invention in connection therewith ready for use.

Fig. 2 is a similar view showing the device in use.

Figs. 3 and 4 are end elevations showing the parts in positions of Figs. 1 and 2, respectively.

Fig. 5 is an end elevation of a trunk showing the connecting device at the opposite end from the end shown in Figs. 3 and 4.

To show one of the advantageous uses of the invention a trunk 1 provided with a hinged side 2 is mounted upon a support 3, in this instance the runningboard of an automobile. Preferably the trunk is mounted on the runningboard with the hinged side 2 of the trunk toward the vehicle.

To one end of the trunk body adjacent to the lower edge thereof a plate 4 is secured by fasteners 5 of construction incapable of being removed without breaking or destroying them. The lower end of the plate 4 is curved outwardly and upwardly to provide a hook 6 arranged to engage with a clip 7 attached to the runningboard or support 3 by fasteners 8 passing through the ends of the clip and through the runningboard and through a transverse strengthening metallic plate 9 below the support. The construction and relationship of the hooked plate 4 with respect to the clip 7 is such that a close and tight binding engagement is obtained when the hook is passed through the clip; so that when the lower side of the trunk rests upon the support relative vibration of the trunk is prevented so that the trunk will not rattle or chatter during travel of the automobile.

To the opposite end of the trunk body a plate 10 is attached by fasteners 11 which are incapable of removal without destruction. A link 12 is pivoted to the lower end of the plate 10 and preferably has its ends abutting and united by welding, or otherwise, to provide a strong supporting link that cannot be opened or pried apart without breaking.

One of the members of the locking devices comprises a plate 13 shaped to provide a pair of side flanges 14 through which the link 12 extends, thereby pivotally supporting said part. The plate 13 is also provided at one end with an integral curved extension 15, and at the opposite end supports a pin 16, the ends of which in the effective position of the locking device are between the sides of the link 12 and thereby rendered inaccessible so that the pin cannot be driven out or removed. The cooperating member 17 of the lock is pivotally supported upon the pin 16 and, on its opposite end, is provided with a hook 18 obtained by rebending the part 17 so that the hook extends toward the trunk. A clip 19, similar to the clip 7, is similarly attached to the runningboard or support 3 by fasteners 20 passing through the ends of the clip 19 through the running board or support and through a strengthening metallic plate 21 extending transversely of the runningboard or support. These fasteners 20 when in final adjustment are incapable of manipulation by any tool and must be broken or destroyed to remove the clip.

The latch devices are shown disconnected from the clip 19 in Figs. 1 and 3, and connected in Figs. 2 and 4, in which latter views it will be observed that the pivotally supported part 13—14 is turned inwardly beyond dead center with respect to the link 12 and the support to which it is pivoted, thus tending to hold the parts in latching engagement.

The arm 15 is formed with a slot 22 arranged to receive a pressed out portion 23 of the part 17 when the locking devices are in engagement. The pressed out portion 23 receives the hasp of a lock 24 whereby the parts may be locked together until the lock is opened by the owner.

The hook 18 obtains tight and binding engagement with the clip 19 and, in cooperation with the holding devices at the opposite end of the trunk, clamps the trunk firmly upon the support in a position to prevent the trunk from being opened and to prevent the trunk from rattling or chattering during travel of the automobile, and to prevent tampering by unauthorized persons.

From the foregoing it will be seen that my invention is capable of economical manufacture and meets an existing need that has arisen from modern conditions incidental to the use of automobiles by traveling salesmen and others for the transportation of trunks, sample cases and the like.

The construction and arrangement may be varied without departure from the nature and principle of the invention in which I do not restrict myself to unessential details, but desire to claim:

1. The combination with a trunk or the like and a support, of a clip rigid with the support, a link pivoted to the trunk, a lever pivoted upon said link, a pivot pin on said lever, a plate pivoted on said pin, a hook on said plate arranged to engage said clip, and means for holding said lever in position in which said hook and said clip are clampingly engaged and in which said pivot pin has its ends within said link.

2. A device of the character described comprising a swinging link having side portions, an element pivoted to said link, a pin supported by said element and movable thereby to position between the side portions of said link, an engageable element pivoted on said pin, and means for securing said two elements together in a relationship in which said pin is within said link.

LEWIS W. CHRISTOPHEL.